United States Patent [19]

Morris et al.

[11] Patent Number: 4,926,802
[45] Date of Patent: May 22, 1990

[54] TUNED MANIFOLD

[75] Inventors: Guy D. Morris, Rettendon Common; Trevor A. Jordon, Hullbridge; William C. Davidson, Woodham Ferrers; Timothy J. Bowman, Bexley, all of England

[73] Assignee: Ford Motor Company, Dearborn, Mich.

[21] Appl. No.: 285,158

[22] Filed: Dec. 16, 1988

[51] Int. Cl.⁵ .............................................. F02M 9/10
[52] U.S. Cl. ............................ 123/52 M; 123/52 MB
[58] Field of Search ........ 123/52 M, 52 MV, 52 MC, 123/52 MB

[56] References Cited

U.S. PATENT DOCUMENTS 4,722,307  2/1988  Okuno et al. .................... 123/52 M

FOREIGN PATENT DOCUMENTS 1111718  3/1956  France ............................ 123/52 M
0048720  4/1977  Japan ............................. 123/52 M
0116022  6/1986  Japan ............................. 123/52 M Primary Examiner—David A. Okonsky
Attorney, Agent, or Firm—Jerome R. Drouillard; Clifford L. Sadler

[57] ABSTRACT

A manifold for a bank of four cylinders of an engine comprises four primary tracts each leading to a respective cylinder, and two secondary tracts each connected at a respective one of two branching points to a respective pair of primary tracts which lead to cylinders of which the combustion cycles are in antiphase. The two branching points are arranged contiguous to one another to form a decoupling chamber between which there is disposed a valve connecting the two branching points. The resonant frequency of the manifold can be changed by opening and closing the valve.

5 Claims, 1 Drawing Sheet

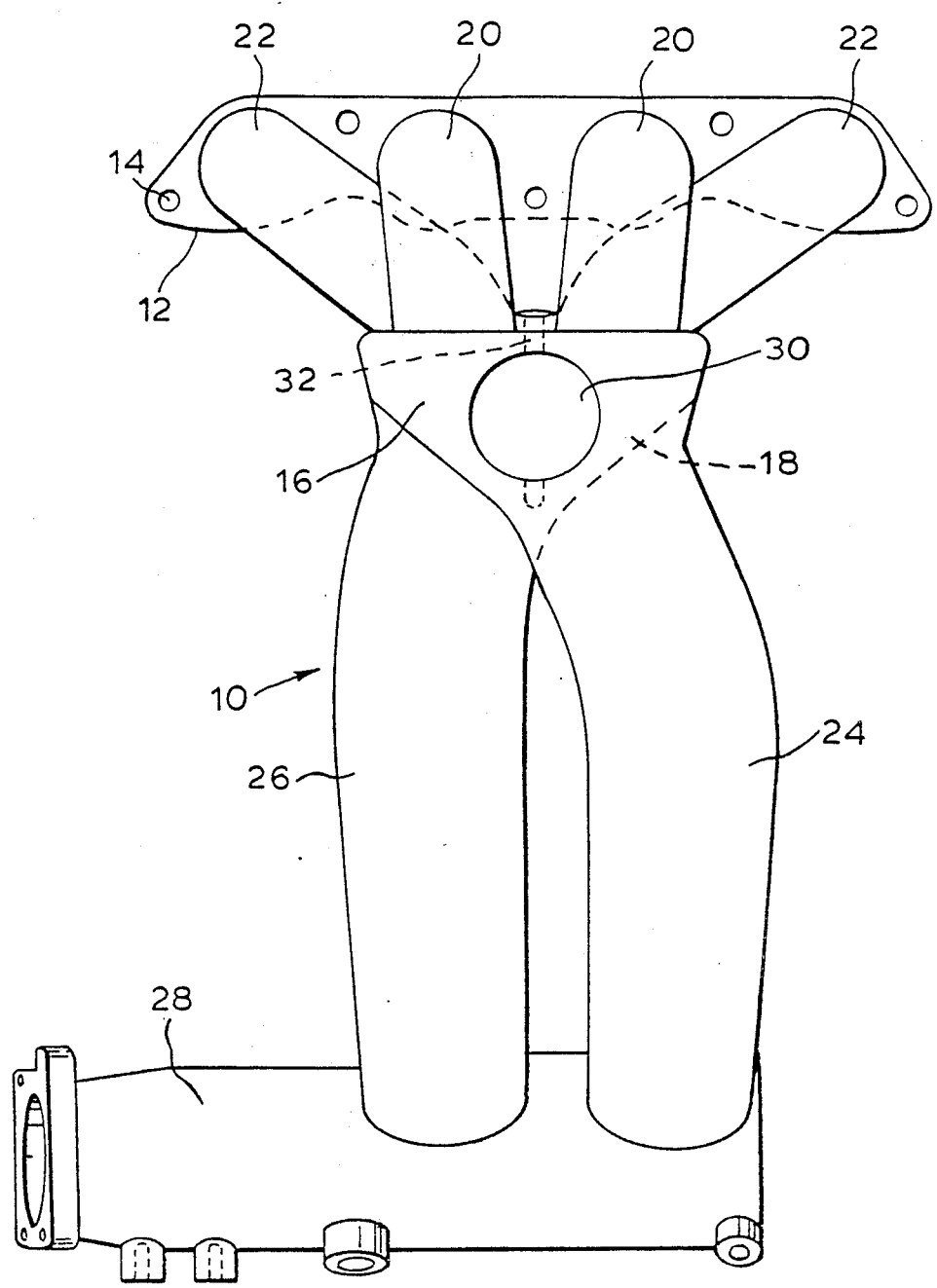

TUNED MANIFOLD

The present invention relates to tuned inlet or exhaust manifolds, being in the case of an inlet manifold intended especially for use in a fuel injected internal combustion engine.

It is known to tune the length of an inlet manifold in order to set up a standing wave in the branch leading to a cylinder at certain speeds so as to create a high pressure node at the inlet valve while it is closing so that the density of the intake air and therefore the total charge of air is increased. Similarly, it is known to tune exhaust manifolds to create a drop in pressure at the instant of valve closing to assist with scavenging.

For a fixed length of each branch, any manifold will only resonate at a certain engine speed and usually manifolds are tuned to provide increased torque at high speeds. It is however, desirable to be able to vary the effective resonant length of the branches of an inlet manifold so that the branches may resonate at more than one engine speed and thereby provide increased torque over a broader range of engine speed.

As will be generally appreciated, the greater the length of a pipe, the lower the frequency at which it will resonate and manifolds tuned to provide increased torque in the lower speed range require a great deal of space and present packaging problems. These problems are aggravated if it is further required to be able to vary the effective resonant length of the branches so that they may resonate at different engine speeds since it is then necessary to act upon the individual branches in unison.

Varying the effective length of a manifold runner by means of a valve selectively controlling flow through different length runners is known.

U.S. Pat. No. 4,726,329 to Atkin shows a two-piece manifold runner with a valve 13 dividing the length of the runner to change the tuning by changing the length of the runner.

U.S. Pat. No. 4,765,285 to Kobayashi, U.S. Pat. No. 4,669,428 to Ichida et al., U.S. Pat. No. 4,664,076 to Miyano et al., U.S. Pat. No. 4,690,106 to Nakayama et al. and U.S. Pat. No. 4,726,340 to Hasegawa et al. all show two different length manifold runners with one controlled by a throttle valve. Each provides a different tuning.

U.S. Pat. No. 4,722,307 to Okuno et al. shows a manifold with a surge tank 14 connecting the six cylinders, a throttle valve 28 being located between two groups of cylinder runners. When open, the throttle valve connects the two groups to provide an effective short intake tuning length to the runners. When closed, a longer effective tuning length is provided.

It should be noted, however, that while all of the above prior art teach changing the tuning by changing the effective length of the runners by means of a valve, the changes are made only to the individual cylinder runners. There is no interaction between the runners of various cylinders. There is no valve to connect or disconnect flow between runners of different cylinders.

U.S. Pat. No. 4,527,392 to Sato et al. does show a valve controlling a passage to connect or disconnect flow between two groups of manifold runners of equal length. However, there is no construction wherein the runners cross over one another for compactness, with a common partition defining the bottom of one runner and the top of another runner, and an opening in the partition closed or opened by a valve to control communication between the two to control tuning of the runners.

According to the present invention, there is provided a manifold for a bank of four cylinders of an engine, the manifold comprising four primary tracts each leading to a respective cylinder and two secondary tracts each connected at a respective one of two branching points to a respective pair of primary tracts which lead to cylinders of which the combustion cycles are in antiphase, wherein the two branching points are arranged adjacent one another to form a decoupling chamber within which there is disposed a valve connecting the two branching points.

Because the two cylinders associated with each secondary tract operate in antiphase, the pulses created by the two cylinders are sufficiently far apart in time not to interfere with one another to any significant extent. Also, if the valve connected between the two branching points is closed, the two secondary tracts operate independently of one another so that each cylinder is effectively connected to a length of pipe equal to the sum of the lengths of one of the primary tracts and one of the secondary tracts. This is the condition which will be selected in use to obtain at lower engine speeds.

At higher speeds, the valve between the branching points is opened to connect the branching points to one another and form a large volume decoupling chamber. The pulses reaching the chamber will now no longer be separated from one another in time and in view of the volume of the decoupling chamber the effect of varying pressure pulses will be largely cancelled out. The resonant lengths of pipe will now amount only to the lengths of the primary tracts and these will resonate only at higher engine speeds.

In this manner by the use of a single valve, it is possible to tune the lengths of all four branches of the manifold simultaneously and make a particularly compact arrangement of the tuned manifold.

Preferably, the secondary ducts are in the form of tubes extending side by side and crossing over at their ends nearer the primary ducts such that the branching points are disposed one above the other.

Advantageously, each branching point is shaped in such a manner that a minimal discontinuity is presented to air flow between the secondary tract and the primary tract leading to the cylinder having an open valve.

In the case of an inlet manifold, each secondary tract may lead directly to an air filter and include a respective air throttle valve but it is preferred that each secondary tract should lead to a common secondary plenum which does not form part of the resonant system of the inlet manifold.

In the case of an exhaust manifold, the secondary tract may constitute the down pipes and be joined to one another at the connection to the exhaust pipe.

The valve between the branching points may conveniently be formed as a butterfly valve arranged in an opening in a wall common to the two branching points.

The invention will now be described further, by way of example, with reference to the accompanying drawing, which is a plan view of a tuned inlet manifold in accordance with the invention.

In the drawing, there is shown an inlet manifold 10 having a flange 12 to be bolted to the cylinder head of an engine and being provided with holes 14 for this purpose. The engine in question is a four cylinder spark ignited fuel injected internal combustion engine with a firing order 1-3-4-2. The pistons of the outer cylinders (1 and 4) are therefore 180° apart in their respective combustion cycles, as are the inner cylinder (1 and 3).

The manifold 10 has two branching points 16 and 18 which are arranged vertically one above the other with the result that the second branching point 18 is obscured from view in the plan view from above and is shown in dotted lines. Each of these two branching points 16, 18 is in the form of a generally triangular chamber connected at along one side to a respective pair of primary tracts 20, 22 leading to a respective pair of cylinders operating with opposite phase.

The two inner cylinders of the engine block are connected to the upper branching point 16 by the primary tracts 20 while the outer cylinders are connected to the lower branching point 18 by the primary tracts 22. The primary tracts are all of equal length, this length being selected to resonate at a relatively high engine speed.

Each of the branching points 16, 18 is connected along a second side to a respective one of two secondary tracts 24 and 26 which are again of equal length and lead to a plenum chamber 28. The plenum chamber in turn leads to a butterfly air intake control valve and to an air filter, but these may be conventional and are not described in the present specification. The plenum chamber 28 also has various conventional connection sockets which are illustrated in the drawing but need not be described further within the context of the present invention.

The two chambers which constitute the branching points 16 and 18 share a common horizontal wall in which there is formed a circular aperture. A butterfly flap 30 is pivotably mounted within this aperture and is secured to a shaft 32 journaled in the manifold. A further aperture is formed in a wall of one of the two chambers constituting the branching points to enable assembly of the butterfly flap 30 on its shaft and this aperture is closed by a blanking plug after assembly. The pressures in the two branching points may be isolated from one another by closing the butterfly flap 30, and by opening the butterfly flap 30 the two branching points can be connected to one another.

When the butterfly flap 30 is closed, each pair of cylinders supplied through a given branching point are isolated from the other pair. Furthermore, the cylinders of the pair operate in antiphase and their pressure pulses to a large extent do not interfere with one another. Thus in this condition, each cylinder is connected to the plenum chamber 28 by a primary tract 20 or 22 and a secondary tract 24 or 26 and the sum of the lengths of these two tracts dictates the effective resonant frequency of the inlet system leading to the individual ports. This length is selected to resonate at a low engine speed.

When the butterfly flap 30 is open, the two chambers of the branching points 16 and 18 communicate freely with one another with the result that the pressure pulses from the individual cylinders cancel one another out and the pressure waves traveling in the primary tracts meet a considerable discontinuity on reaching the branching points and are reflected back towards the inlet ports. The primary tracts alone therefore resonate under these conditions and their length is selected to resonate at higher engine speeds.

In this manner, the characteristics of the manifold 10 can be altered by opening and closing the butterfly flap 30 to provide two resonant peaks each suited to a different range of engine speeds.

The butterfly flap 30 has been considered as being either fully open or fully closed but one can empirically deduce that in the intermediate range of opening of the flap 30 the resultant characteristic will fall somewhere between these two extremes and it is therefore possible to operated the butterfly either in an on/off mode depending on whether a threshold engine speed is exceeded or to vary the extent of opening of the valve continuously to provide broad band tuning over an extended range of engine speeds.

On reaching the plenum chamber, the pulses from the individual cylinders always tend to cancel out and this coupled with the large dimensions of the plenum chamber 28 ensure that the chamber does not form part of the resonant system, neither when the butterfly valve 30 is open nor when it is closed. It is possible to dispense with the plenum chamber 28 and to connect each of the secondary tracts 24 and 26 to an air filter by way of a respective throttle valve.

Though the invention has been described above by reference to an inlet manifold, it will be clear that it is equally applicable to an exhaust manifold. In such case, the individual branches from the cylinder can be connected in pairs at respective junctions to two down pipes and the junctions may be connected to one another by a valve to form a decoupling chamber. The lower ends of the down pipes may be connected to the exhaust pipe in the usual manner.

While the invention has been shown and described in its preferred embodiment, it will be clear to those skilled in the arts that many changes and modifications may be made without departing from the scope of the invention.

We claim:

1. A manifold for a bank of multiple cylinders of an engine having a number of pairs of primary tracts, each primary tract leading to a respective cylinder and a pair of secondary tracts each connected at a respective one of two separate branching points to a respective pair of pimary tracts which lead to cylinders of which the combustion cycles are in antiphase, wherein the two branching points are arranged adjacent one another and form between a decoupling chamber within which there is disposed a valve connecting the two branching points, characterized in that the secondary tracts cross over at their ends near the primary tracts such that the branching points are contiguous and disposed one above the other, and in that all the primary tracts are of equal length.

2. A manifold as claimed in claim 1, wherein each branching point is shaped such that a minimal discontinuity is presented to air flow between the secondary tract and the primary tract leading to the cylinder having an open valve.

3. A manifold as claimed in claims 1 or 2, wherein each secondary tract leads to a common plenum chamber which does not form part of the resonant system of the manifold.

4. A manifold as claimed in claims 1 or 2, wherein the valve between the branching points is arranged in an opening in a wall common to the two branching points.

5. A manifold as claimed in claims 1 or 2, wherein the secondary tracts extend for the most part side by side and cross over one another in a contiguous manner at the branching points, the secondary tracts at the crossover having a common wall defining the top of one tract and the bottom of the other tract, the wall having an opening therein closable by the valve, the opening connecting the two tracts when the valve is opened to define the decoupling chamber.

* * * * *